INVENTORS
ROBERT WONG &
BY HOMER G. HILL

Staelin + Overman
ATTORNEYS

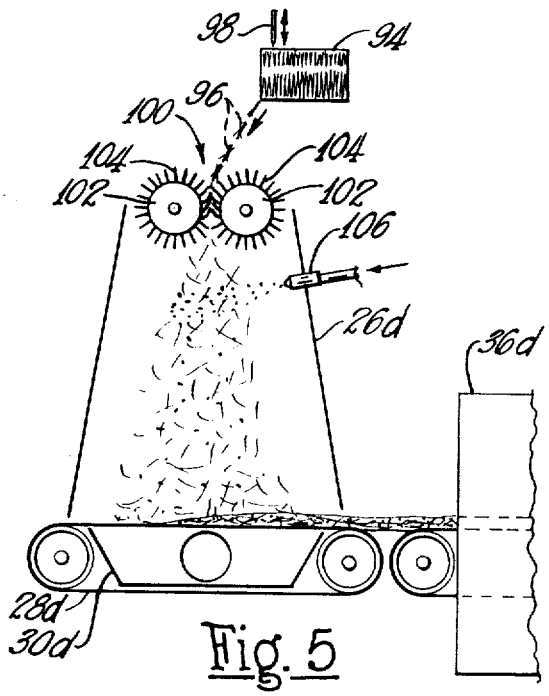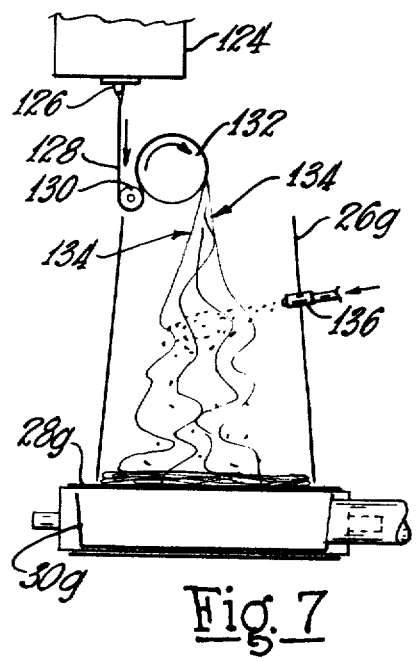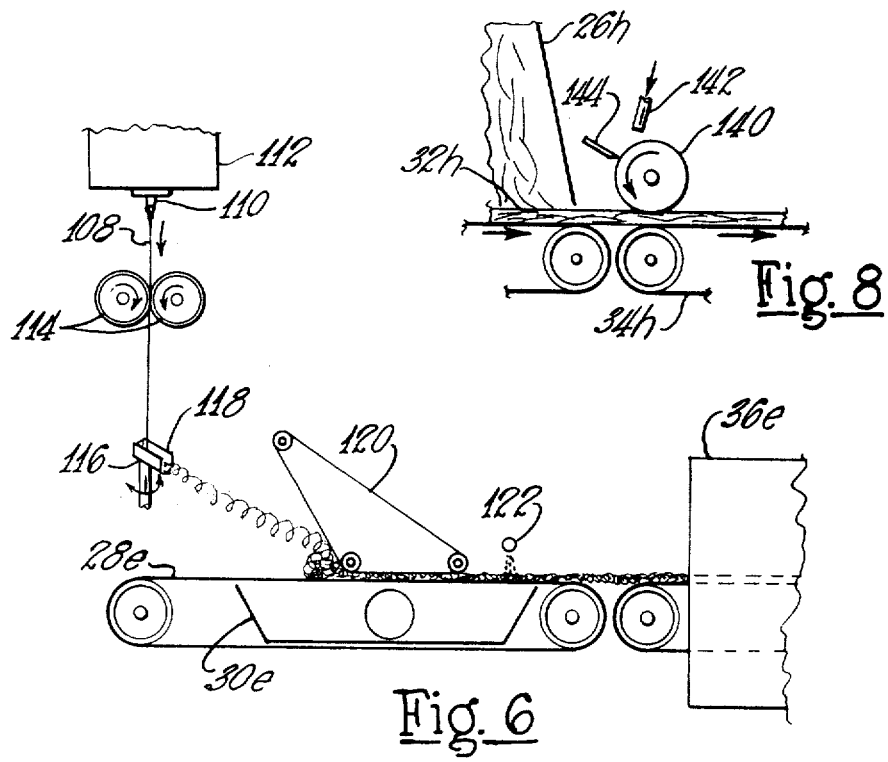

United States Patent Office 3,669,638
Patented June 13, 1972

3,669,638
METHOD OF PRODUCING BONDED RANDOMLY ORIENTED GLASS FIBER MATS AND BATTS
Robert Wong, Granville, and Homer G. Hill, Newark, Ohio, assignors to Owens-Corning Fiberglas Corporation
Filed Dec. 11, 1968, Ser. No. 783,072
The portion of the term of the patent subsequent to Oct. 13, 1987, has been disclaimed
Filed Dec. 11, 1968, Ser. No. 783,072
Int. Cl. C03c 25/02
U.S. Cl. 65—3
11 Claims

ABSTRACT OF THE DISCLOSURE

The method of producing bonded randomly oriented glass fiber mats and batts wherein the binder is applied to the glass fibers of the mats or batts in a gel thickened state. The gel thickened binder can be sprayed into an air stream which carries the glass fibers to a foraminous collection surface. The globules of gel are caught and retained by the fibers gathered on the collection surface so that little binder leaves with the exiting air stream. The improved method reduces air pollution, improves binder transfer efficiencies, and the strength of the finished bonded mat.

BACKGROUND OF THE INVENTION

Randomly oriented glass fibers bonded together at fiber cross-over points are made into what are called batts for use as insulation materials in buildings, etc. These batts are usually made from one to twelve or more inches thick, and are made up of fine, highly dispersed filaments for minimum density. Bonded, randomly oriented glass fibers are also produced in relatively thin layers called mats for use in reinforcing plastics. These mats may be made of highly dispersed fibers, sometimes called dispersed fiber mat, or may be made of strands of glass fibers, known as strand mat. Strand mats may be produced from randomly oriented, chopped short lengths of strand to form chopped strand mat, or may be made of long lengths or continuous strands to be called continuous strand mat. The continuous strands may be randomly gathered on the collection surface, or can be formed into convolutions which are then deposited on the collection surface to produce what is known as swirl mat.

In all the processes for making mats and batts with which we are concerned, the glass fibers used to form the mats are deposited on a foraminous surface, usually a conveyor, but sometimes a drum, through which a large volume of air is drawn to uniformly collect and hold the fibers onto the collection surface. Ever since the beginning of the industry, the binder has been applied to the fibers forming the mats or batts as aqueous solutions or dispersions which are sprayed onto the fibers in the presence of a large volume of air that is used to collect the fibers on the collection surface. Conventionally, binder has been sprayed onto the fibers in the air stream prior to being gathered on the collection surface. The sprays produce a high degree of fine particles and mist, generally thought desirable to assure fiber wet out. These liquid sprays, however, have such a large surface to volume ratio that a sizable percentage pass through the collected fibers without impingement upon the glass fibers; and what is more, some of the binder solution or dispersion is pulled from the fibers and carried along with the air that leaves the fiber collection surface. Loss of binder material also occurs due to the volatilization of the water and binder materials in the large volume of collection air, and this volatilization is further increased as the sprays are moved closer to the hot forming apparatus which produces the attenuated glass fibers. The art has made every effort to reclaim the binder materials from the exiting gases but, nevertheless, a sizeable percentage of binder is lost as discharge air contaminants.

An object of the present invention is the provision of a new and improved method of producing bonded mats and batts which will substantially eliminate binder loss as well as the contamination of the gases discharged from the system.

SUMMARY OF THE INVENTION

According to the invention, a new and improved method of applying binder to the glass fibers forming mat and batt is provided which greatly improves binder application efficiency and reduces air pollution. In those processes where the fibers are formed into mat or batt on a collection surface by means of fiber carrying air flows, the binder is applied to the fibers in the form of subdivided globules of gel. The globules of gel are retained by the mat to a much greater degree than are the same size particles of liquid, and what is more, gel when subdivided provides larger and more uniformly sized particles than do solutions that are discharged from spray nozzles.

One of the losses of binder material which is experienced in the prior art occurs by reason of the evaporation of the more volatile binder constituents. The prior art has desired to introduce sprays of liquid binder into the mat forming processes as close as possible to the point of formation of the fibers in order to get more complete wet out of the fibers with the binder. In those mat or batt making processes wherein the fibers are discharged immediately after attenuation, the fibers are introduced into the carrying air stream while relatively hot and while surrounded by hot gases. The hot fibers and the hot gases increase the amount of volatilization of binder constituents which takes place, and so the prior art has had to compromise the amount of volatilization and binder loss produced with the degree of fiber wet out achieved. An unexpected advantage of the present invention occurs by reason of the fact that binder in the form of a gel does not volatilize as readily as does a binder liquid, and the globules of gel can, therefore, be applied to the fibers more closely adjacent to their point of production.

A still further advantage of the present invention occurs by reason of the fact that the particles of gel which are caught up by the fibers in the mat and batt making process can be redistributed throughout the fibers of the mat or batt under controlled conditions without the removal of an appreciable amount of the gel from the mat or batt. Some types of gel change to a liquid when heated and with this type of gel, the gel on the mat can be heated to a controlled degree to change the surface of the gel particles to a liquid which allows the particles to migrate along the fibers to cross-over points of the fibers where the particles of gel become lodged. Evaporation of the solvents forming the gel converts or thickens the gel particles into binder solids which then cure in situ to lock the fibers together at their cross-over points. A stronger more adequately bonded mat or batt is thus produced.

Redistribution of the particles of binder gel and mat may also be accomplished in some instances by changing the pH of the surface of the particles of the gel. Carbopol, for instance, forms a thick gel at a pH greater than approximately seven and thin gels or even solutions at a pH less than approximately seven. Mats or batts containing the globules of gel containing Carbopol can, therefore, be subjected to a flow of acid forming gas such as $CO_2$, $SO_2$, $NO_2$, etc. for a short period of time to thin out the surface of the particles of gel and allow the particles to migrate to cross-over points of the fibers. Thereafter, the mat or batt can be subjected to the flow of an ammonia containing gas which will cause the particles to set up into a firm gel and remain in this condition during subsequent evaporation of the binder solvent.

Whereas droplets of binder liquids are easily dislodged and swept free of the mat or batt by the fiber collecting air flow, particles of gel are not easily dislodged once they have been caught up by the fibers. The process of the present invention, therefore, provides very high binder collecting effciency with very little loss to the exiting air flow. While the gel type binders of the present invention can be applied adjacent the point of fibers formation with greater efficiency than can the prior are liquid binders, the invention is not so limited since the high degree of control and binder redistribution provided by the invention also makes it feasible to direct the globules or particles of gel onto fibers already collected in the form of a mat or batt.

Further objects and advantages of the present invention will become apparent to those skilled in the art to which the invention relates from the following description of the preferred embodiments described with reference to the accompanying drawings.

BRIEF DESCRIPTION OF THE DRAWINGS

FIG. 5 is a schematic drawing of a fifth embodiment of the invention wherein a fiber picker is used to produce lengths of strand from which mat is made;

FIG. 6 is a schematic view of a sixth embodiment of the invention wherein continuous strand is swirled and deposited in the form of a mat;

FIG. 7 is a schematic view of a seventh embodiment of the invention wherein a continuous strand is deposited in random coils to produce a mat; and FIG. 8 is a schematic fragmentary view showing a roll type applicator for applying the gel binder to the mat or batt.

DESCRIPTION OF THE PREFERRED EMBODIMENTS

Figure 1:
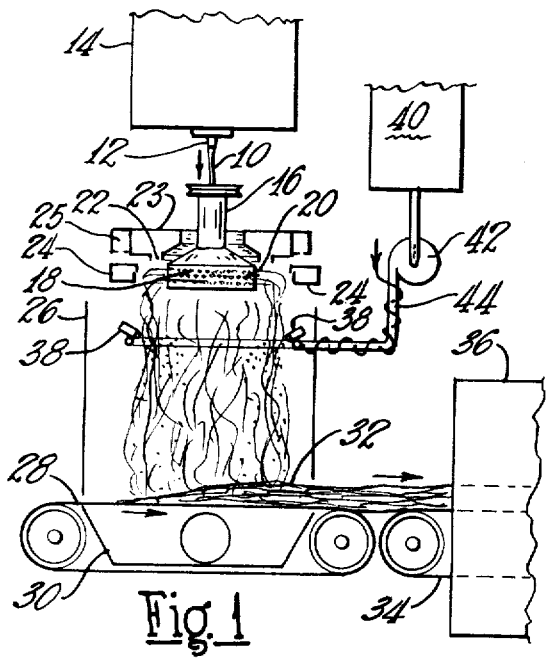
FIG.1 is a schematic view of one embodiment of the present invention wherein centrifuging apparatus is used to produce the fiber from which batt is made.

A large percentage of the glass fiber insulation material used in buildings is made by a combination centrifuging and hot gas attenuating process. The embodiment of the present invention which uses that process is shown in FIG. 1, wherein a molten stream of glass 10 flows from an orifice 12 in the bottom of a glass furnace 14 into a centrifuge 16. Small streams of glass issue from holes 18 in the side walls of the bottom basket 20 of the centrifuge where they are impinged upon by an annular ring of high temperature, high velocity gases which issue from an annular opening 22 in an annular burner 23 which surrounds the basket. The high temperature gases from the annular burner 23 keep the streams of glass molten, following which they are impinged upon by high velocity steam issuing from an annular steam jet ring 24. The steam jet 24 induces a flow of air inwardly between the burner 23 and jet ring 24, and this air flow is heated by an annular heater ring 25 which discharges low velocity products of combustion into the air stream. The attenuated glass fibers are discharged into a forming hood 26 which directs the fibers and glass flow to the top foraminous surface of a collection conveyor 26 having a suction pan 30 positioned therebeneath. Secondary air is pulled into the top of forming hood 26 to cause the fibers to collect in a batt 32 which is carried out of the collection hood 26 and transferred to a curing conveyor 34 which moves the batt through a curing oven 36. Reference may be had to U.S. Pat. 2,931,422 for more complete detail of the equipment so far described. In some instances, the steam jet ring 24 is eliminated and the high velocity products of combustion issuing from the annular burner 23 is depended upon for the attenuation of the fibers. In still other instances, the heater ring 25 is eliminated, so that the fibers issuing from the centrifuge cool faster and form larger diameter fibers.

According to the present invention, particles of a gel containing a binder that is to be cured in the curing oven 36 are collected with the fibers in the forming hood 26 prior to reaching the oven. In the embodiment shown in FIG. 1, the particles of the gel that are collected with the fibers are produced by spray nozzles 38 that are positioned immediately below the basket 20 to provide optimum mixing with the glass fibers during their movement from the forming area to the collection surface of the conveyor 28. The particles of gel, therefore, are distributed generally uniformly throughout the thickness of the batt 32 and upon entering the oven 36, the surface of these gel particles are softened to allow the particles to move slowly to the fiber cross-over points if they have not already done so. A high percentage of the particles of gel, therefore, are lodged at the fiber cross-over points in the redistribution of the gel which takes place on entering the oven 36 following which evaporation of the gel solvent causes the consistency of the gel particles to increase, causes the gel to flow around the fibers junction points, and then be cured into a rigid condition. Most of the binders which are used to form insulation materials are thermosetting binders and are usually phenolics in one form or another.

One suitable binder resin which can be used in the process shown in FIG. 1 can be made of the following materials in the given approximate percentages by weight:

| Material: | Percent solids |
|---|---|
| Phenol-formaldehyde-melamine resin | 73 |
| Ammonium sulphate | 0.5 |
| Gamma aminopropyl triethoxy silane | 0.1 |
| Melamine crystals | 2.1 |
| Vinsol (pine wood extract) | 13.3 |
| Emulsified petroleum oil | 6.7 |
| Gelling agent | 4.5 |
| Ammonia pH adjustment, pH 2 to 5. | |

The phenol-formaldehyde-melamine resin is made by charging 47.2 parts of formalin (52% solids) and 36.6 parts of phenol to a reactor and thoroughly mixing. Two parts of barium oxide is mixed with 10 parts of water to form a dispersion, and the dispersion is added to the reactor. The ingredients of the reactor are cooked for two hours at 100° F., and 1.9 parts of a 20% sulphuric acid solution is added to neutralize the resin.

The gel thickened binder is used as a gel thickened, water solution containing approximately 16 percent solids. The gel thickened binder is made by mixing the gelling agent solution with the remainder of the binder solids diluted with the other half of the water. Both solutions are kept above approximately 120° F. and the binder solution is slowly blended into the solution of the gelling agent with mixing. The gelling binder material is kept in a heated tank 40 and is pumped to the nozzle 38 by a steam traced centrifugal pump 42 and steam traced conduits 44 to keep the material at a temperature above approximately 120° F. This gel thickened material is a heat sensitive one which is a non gel above approximately 120° F., and which reverts to a gel below approximately 120° F. The gel thickened binder when sprayed into the forming hood solidifies into gel thickened binder particles that are caught by the fibers during their movement toward the top surface of the fiber collecting conveyor 28.

Because the starch gelling agent is temperature sensitive, the gel redistributes on the fibers, as described above, when the batt enters the curing oven 36. The air flow in the curing oven is much less than that in the forming hood 26, so that even though the gel is thinned, or even broken, the binder remains as globs and is not pulled from the batt.

Suitable gelling agents which can be used to produce gels of a pseudo-plastic nature are Carbopol, Methocel, and highly cross-linked polyacrylamides, whereas gelling agents which produce thixotropic gels are Thixin R, microcrystalline cellulose, Benaqua, and Baymal. Gelling agents should be used between approximately 0.2 and 15% by weight of the binder solution or dispersion, and can be used either as a flowable gel or as a set gel depending on concentration and type of gelling agent. Gels made of Methocel (usually methylcellulose) flow when used in a concentration below approximately 2% and those made using Carbopol flow at varying percentage levels depending upon the concentration of the Carbopol and the pH. Carbopol when used in a concentration of 0.2 and a pH below 7 is a flowable gel. In a concentration of ½% on the alkaline side, it is a fairly stiff gel, whereas on the acid side, it is a flowable gel. Thixin R produces temperature sensitive gels in concentrations above approximately 0.5%, and these gels break at approximately 118° F. Thixin R will usually be in a concentration above approximately 3% to form a stiff gel. Microcrystalline cellulose will usually be used in a concentration above 4% to form a stiff gel. Any of the gelling agents can be used in the above resin mix in place of the starch gelling agent above described.

Another phenolic resin which can be used in the binder can be made from the following:

| Ingredients: | Parts by weight |
| --- | --- |
| Formaldehyde (52%) | 51.2 |
| Phensol USP | 31.0 |
| Barium oxide | 2.4 |
| Water | 12.9 |
| Sulphuric acid concentrated | 2.1 |

The resin is made by adding the formaldehyde and the phenol to a reactor and mixing for five minutes. The barium oxide is dissolved in 10.8 parts of water and charged to the reactor and the reactor ingredients are cooked for two hours at 100° F. The temperature is then increased to 110° F. and held for 1½ hours following which it is raised to 125° F. and the ingredients cooked for two hours. The temperature of the reactor is then raised to 140° F. and held for approximately 5 hours to decrease the formaldehyde concentration below approximately 4.7%. The ingredients are then cooled to 100° F. and neutralized with the acid and the remainder of the water.

The binder formulation can be made from the following ingredients:

| Ingredients: | Parts |
| --- | --- |
| Organo silane coupling agent (gamma aminopropyl triethoxy silane), by weight | 0.1 |
| Ammonium sulphate, by weight | 0.8 |
| Red dye (pontamine fast dye), by weight | 0.7 |
| Urea, by weight | 25.0 |
| Phenol formaldehyde resin, by weight | 58.4 |
| Reconstituted water solution (adjust pH to 8.5) | |
| Emulsified petroleum oil (60% solids) | 10 |
| Gelling agent | 5 |

The gelling agent can be any of the gelling agents above described including the starch-hexanol-boric acid acid material, and the above ingredients are mixed with water as above described to give a solution having 20% solids. The result is a gel thickened material at temperatures below approximately 120° F. and which can be used in the above described process.

Another phenolic material which can be used as a binder will comprise the following ingredients:

| Ingredients: | Parts by weight |
| --- | --- |
| Formaldehyde (54%) | 57.9 |
| Phenol (natural) | 35.0 |
| Barium oxide | 2.8 |
| Water | 9.0 |
| Sulphuric acid (20% solution) | 1.8 |

This material is prepared by adding the phenol and formaldehyde to a reactor and mixing for five minutes. The barium hydroxide is dissolved in the water to form a solution which is then added to the reactor. The ingredients of the reactor are then cooked for two hours at 100° F., the temperature is raised to 110° F. for 1½ additional hours, and it is then raised to 125° F. and cooked for an additional two hours. Thereafter the temperature of the reactor is raised to 140° F. and is held for four and one quarter hours. A syrupy phenolic resole is formed which is then cooled to 100° F. and neutralized with the sulphuric acid solution.

Figure 2:
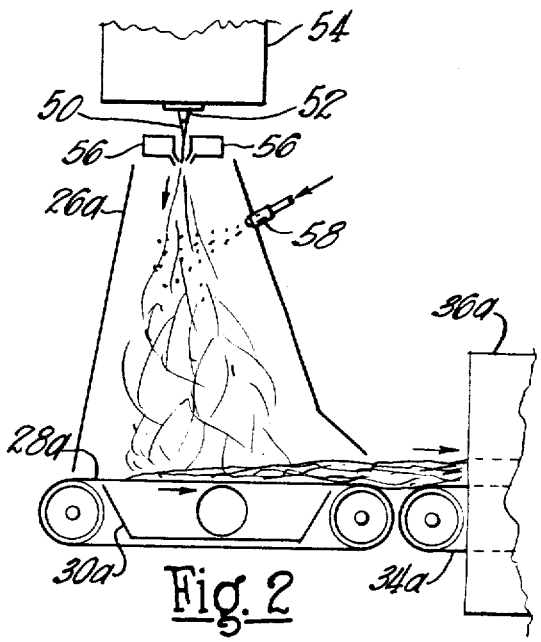
FIG. 2 is a schematic drawing of a second embodiment of the present invention wherein high velocity gases are used to attenuate the fiber from which batt is made.

The invention can also be used in the process depicted in FIG. 2 of the drawings. The apparatus shown in FIG. 2 is generally similar to that shown in FIG. 1, differing principally in the manner in which the fibers are attenuated and the gel thickened binder is applied. Those portions of FIG. 2 which are identical to similar portions in FIG. 1 are designated by a like reference numeral characterized further in that the subscript $a$ is affixed thereto.

A plurality of small molten streams of glass 50 flow from a plurality or orifices 52 in the bottom of a feeder in melter 54. The small molten streams of glass 50 pass between a pair of high velocity gas jets 56 from which high velocity gases issue to attenuate the fibers. The gases may be steam, or in some instances, they may be high pressure air. The attenuated fibers fall into the forming hood 26a to be collected on the top surface of the conveyor 28a. A gel thickened binder, as for example one of those previously described, is sprayed onto the fibers as they issue from the high pressure velocity jets by means of a nozzle 58. As previously described, when the binder is thickened with a heat sensitive gelling agent, such as starch, thixin R, or one of the other heat sensitive agents, they can be pumped using conventional pumps and steam traced lines which keep the material above the gelling point. When the gelling agent is a pseudoplastic or thixotropic gelling agent, the materials may be applied using high pressure positive displacement pumps and spray nozzles. Reference may be had to Pat. 2,189,840 for further details on those portions of the equipment which are conventional.

Figure 3:
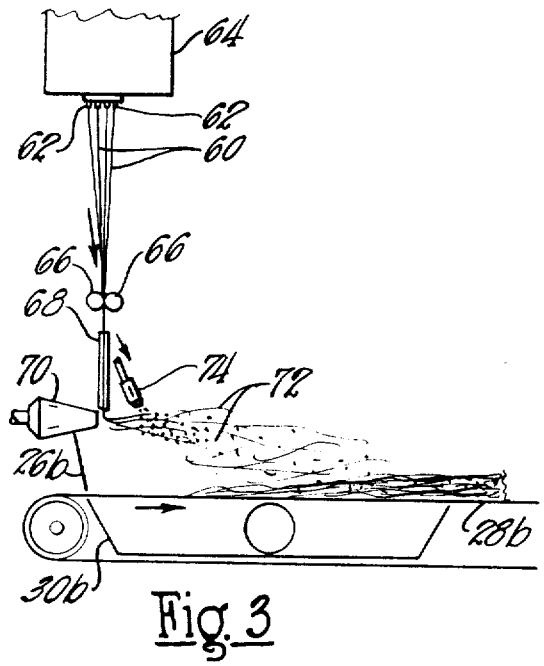
FIG. 3 is a third embodiment of the invention wherein a gas burner is used to attenuate streams of glass into the fiber from which batt is made.

In the embodiment of the invention shown in FIG. 3, a plurality of molten streams of glass 60 are drawn through orifices 62 in the bottom of a feeder from a glass melt furnace 64. After the molten streams have cooled, they pass between a pair of pull rolls 66 which exert a pulling action on the molten streams to attenuate the molten streams into primary fibers. The fibers discharged from the pull rolls 66 pass through a guide 68, which delivers the fibers to the discharge of a gas burner 70, the flame of which impinges upon the fibers to melt the fibers and further attenuate them into fine secondary filaments 72. The fine filaments 72 are carried by the stream of hot gases from the burners 70 into the collection zone 26b where they are mixed with secondary air and deposited upon the fiber collection surface in the manner previously described. The fiber collecting and curing equipment is similar to that shown in FIG. 1 and those portions thereof which are similar to those shown in FIG. 1 are designated by the same reference numeral characterized further in that a subscript $b$ is affixed thereto. For those portions of the apparatus which are conventional, further reference may be had to U.S. Pat. 2,607,075.

According to the invention, the binder which is used to hold the fibers together after they are deposited in the form of a batt is applied to the fibers in the form of a gel thickened material. The binder used in the process shown in FIG. 3 is preferably a thermosetting one in order that the batt produced can be used as an insulation material at relatively high temperatures, and can be any one of the binder materials above described. These binder materials are applied to the fibers by a spray nozzle 74 which distributes particles of gel among the fibers in the gas stream that carries the fibers to the collection surface. In the embodiment shown in FIG. 3, the nozzle is positioned adjacent the exit of the burner 72 and is directed into the most concentrated stream of the fibers at their point of final attenuation. The binder can be supplied to the nozzle 74 using the same equipment shown in FIG. 1 and above described.

Figure 4:
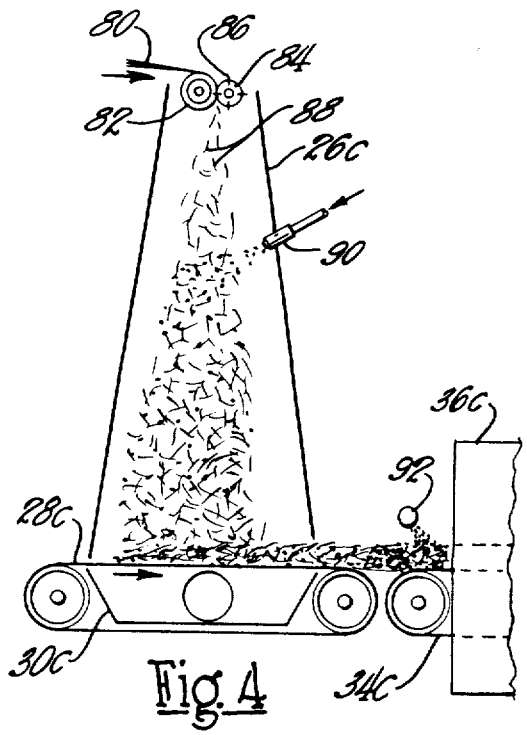
FIG. 4 is a schematic drawing of a fourth embodiment of the invention wherein a chopper is used to produce short lengths of strand from which mat is made.

FIG. 4 depicts the use of the present invention in making chopped strand mat. Strands of glass fibers 80 are fed over a rubber coated roll 82 that is engaged by a roll 84 having a plurality of cutter blades 86 thereon. The blades 86 force the glass fibers into the surface of the roll 82 to chop the strand into lengths between approximately ½ inch and 3 inches long, and these lengths of strand are discarged into a collection hood 26c where they are deposited onto collection equipment. The portions of the collection and curing equipment which are similar to those previously described are designated by the same reference numeral characterized further in that a subscript c is affixed thereto.

The chopped strands produced as above described are collected into what is called a chopped strand mat which has considerable use as a reinforcement for polyester resins. Where the chopped strand mat is to be used as a reinforcement for polyester resins, the binder that is applied to the fibers will also preferably be a polyester resin. One suitable polyester binder for the strands is made from the following ingredients:

| Ingredients: | Parts solids by weight |
|---|---|
| Unsaturated polyester resin (one mol phathalic anhydride, one mol maleic anhydride, two mols propylene glycol cooked to an acid number of 30–35) | 99 |
| Emulsifying agents, Pluronic F 77 [1] | 1 |
| Organo silane coupling agent, vinyl-tris (beta-methoxy ethoxy) silane having the formula $CH_2=CHSi(OCH_2CH_2OCH_3)_3$ | 9.35 |

[1] Pluronic F 77 is a surface active agent made by Wyandotte Chemical Corporation and is a condensate of ethylene oxide, propylene oxide with propylene glycol.

A gelling dispersion of the above ingredients is prepared using two percent of Carbopol and 10 percent of the above solids. The Pluronic F 77 is added to the polyester resin in a mixer and water is added thereto slowly until the emulsion inverts. Additional water is added slowly with mixing until a stable water emulsion is prepared, and thereafter the remainder of approximately one half of the water is added. The organo-silane is then added with mixing. The gelling agent is added to the balance of the water in another mixer and thoroughly dissolved. The emulsion from the first mixer is then added to the solution of the gelling agent with mixing until a gelling blend is produced. This gelling blends is pumped by means of a positive displacement high pressure pump through hydraulic lines to a nozzle 90 that is directed at the collection surface of a conveyor 28c. The mat produced is usually approximately one quarter to one eighth inch thick, but may vary from 1/16 to one inch or more. A spray header 92 directs a spray of ammonia water onto the binder saturated mat to set the binder into a stiff gel. Thereafter the mat is transferred to the curing oven 36c where the water is evaporated and the resin is caused to flow around the fibers without any appreciable loss therefrom, and without a complete cure of the unsaturated polyester resin. The mat thus produced is porous as is desired for later impregnation by more unsaturated polyester resin in the molding process. The thickened state of the binder produced by the ammonia water holds the resin binder in place while the water is evaporating and before binder has partially hardened around the fibers. For a further description of the portion of the apparatus of FIG. 4 which is conventional, reference may be had to U.S. Pat. 2,790,741.

Another example of binder material which can be applied to the chopped strand mat by the nozzle 90 may be made from the following ingredients:

| Ingredients: | Parts by weight |
|---|---|
| Crosslinking polyester resin above described | 70 |
| Diallyl phthalate | 8.4 |
| Sodium hydroxide (50%) | 4.5 |
| Water | 126 |
| Polyvinyl alcohol | 5.5 |
| Phosphoric acid (75%) | 1.8 |
| Pluronic 77 | 4 |

The emulsion is prepared by mixing the emulsifying agent (Pluronic F 77) with the resin, followed by charging this material to a mixer wherein the material is heated to 130° F. The diallyl phthalate is also added and mixed therewith following which approximately one-tenth of the total water is added slowly with mixing to form an emulsion. After the inversion point is reached, the balance of the water is added slowly to provide a stable water emulsion. Thereafter the sodium hydroxide is mixed with approximately one tenth of the water and this solution is added slowly and mixed for five minutes. The remainder of the water is charged to a vessel heated to 170° F. Thereafter the polyvinyl alcohol is added slowly with agitation until it is completely dissolved. This polyvinyl alcohol is then added slowly to the first mixer and completely blended for five minutes. The ingredients are then cooled to approximately 90° F., and the phosphoric acid mixed with approximately one tenth of the water is blended slowly. A pseudoplastic gel is made from these ingredients using 9 parts of Methocel [1] with 91 parts of the above prepared polyester emulsion and this material can be sprayed upon the fibers by the nozzle 80 when it is pumped to the nozzle 80 by a high pressure positive displacement pump.

FIG. 5 of the drawing depicts a process for producing chopped strand mat from coiled packages of continuous glass fiber strand. The coiled packages 94 that are used are similar to those produced for glass fiber textiles. The coiled packages are chopped into hanks 96 of fibers by a chopper shown schematically at 98 in the drawing, and the hanks 96 are fed into conventional picking equipment 100 that is represented by a pair of rolls 102 having picking fingers 104 thereon. The picking fingers 104 pick apart the hanks 96 into individual strands, or small groups of strands, which are then sucked down into the forming hood 26 and collected into a mat by apparatus similar to that previously described. The apparatus for collecting the fibers into a mat is designated by the same reference numeral used in FIG. 1 characterized further in that the subscript d is affixed thereto. For further details of those portions of the apparatus which are conventional, reference may be had to U.S. Pat. No. 3,381,069.

Gel thickened binder is applied to the picked strand that is collected on the conveyor 28d by high pressure nozzle 106 having a spray pattern designed to cover the collection surface uniformly. In those instances where the chopped strand mat is to be used for reinforcing polyester, or other resins, the gel thickened binder may be any one of the polyester binders previously described. The mat containing the gel binder is subsequently dried and cured as above described.

The apparatus shown in FIG. 6 is of the type used to produce what is called "swirl" mat. A plurality of streams of molten glass 108 issue from orifices 110 in a feeder,

[1] Methocel is a cellulose gum of these types: (1) Methocellulose; (2) hydroxypropyl methylcellulose; and (3) butyl methylcellulose.

located in the bottom of a container 112 in which is a supply of molten glass, and solidify into fibers. The fibers are gathered into a strand which is passed between pull rolls 114 which attenuate the fibers. The strand discharged from the pull rolls 114 is directed to an open ended trough 116 whose bottom 118 is generally dish shaped. The strand swirls around the dish shaped obttom 118 and passes therefrom in a helix that is directed at the fiber collection conveyor 283. Those portions of the fiber collection apparatus which are similar to the apparatus previously described in FIG. 1 are designated by a like reference numeral characterized further in that a subscript *e* is affixed thereto. The distributor 116 oscillates about a vertical axis to direct the strand across the width of the conveyor 28*e*. The continuous strand is forced flat upon the collection conveyor 28e by means of an endless screen 120, the lower flight of which is spaced above the top surface of the conveyor 28*e*. The mat of swirled strand after leaving the screen 120 has a gel thickened binder applied, as at 122, which may be any of those previously described depending upon the desired use of the mat. For further description of the portions of the apparatus which are conventional, reference may be had to U.S. Pat. 3,120,463.

The apparatus depicted in FIG. 7 for making continuous strand mat generally comprises a glass melt tank 124 having orifices 126 in a feeder in the bottom thereof from which molten streams of glass 128 issue. The molten streams of glass are attenuated to fibers by the action of a pull wheel. The fibers are gathered together and pass beneath a direction reversing roll 130 and then over the top of a pull wheel 132. The continuous strand of fibers discharged downwardly from the periphery of the pull wheel 132 passes between opposing air nozzles 134 which alternately blast the continuous strand from one side to the other of the collection conveyor 28*g*. Those portions of the collection and curing equipment shown in FIG. 7 which are similar to corresponding portions of FIG. 1 are designated by a like reference numeral characterized further in that the subscript *g* is affixed thereto.

A gel thickened binder is sprayed onto the continuous strand as it is randomly collected on the conveyor by means of high pressure nozzles 136, only one of which is shown in the drawing. The nozzles 136 are arranged to provide an even distribution of the gel particles issuing therefrom across the width of the conveyor 28*g*. The gel thickened binder which is used will depend upon the desired use of the mat, and it may be any of those previously described.

In the embodiments so far described, the binder has been sprayed onto the fibers at various locations in the mat or batt forming operation. It will be understood that the invention is not so limited, and that other means can be used for distributing the binder onto the mat or batt, as is shown in FIG. 8 of the drawings. The apparatus shown in FIG. 8 can be used with any of the processes shown in FIGS. 1 through 7, and those portions of FIG. 8 which are similar to the apparatus shown in FIGS. 1 through 7 are designated by a like reference numeral characterized further in that a suffix *h* is affixed thereto.

The mat 32*h* issuing from the forming hood 26*h* is contacted by an applicator roll 140, which is driven at a peripheral speed equal to that of the conveyor 34*h*. A gelling binder is applied to the roll 140 by a pipe 142, and the gelled binder is distributed evenly across the width of the roll 140 by means of a doctor blade 144. The rotation of the roll 140 carries the layer of gel binder down onto the top surface of the batt where it is forced into the batt between the fibers. The conveyor 34*h* carries the batt to the curing oven, where the temperature causes the gel binder to first distribute itself through the batt, and then cure to bind the fibers together. In some instances it may be desired to rotate the applicator roll 140 at a speed that is different from the conveyor 34*h*, as for example at a slower speed, so that the batt will wipe the layer of gel from the surface of the applicator roll. In other instances the applicator roll 140 may be driven faster than the conveyor 34*h* to bring a greater quantity of the gel binder in contact with the batt following which the roll 140 forces the gel downwardly between the fibers and the slipping action used to wipe the gel from the roll 140.

It will be understood that although the invention has been described using specific binders with specific mat or batt forming apparatus, the invention is not so limited, and any type of organic resin producing binder and gelling agents can be used.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. In the method of producing bonded glass fiber mats wherein molten streams of glass are attenuated by a stream of hot gases from which the fibers are collected in the form of a mat, the improvement comprising: carrying fibers in a gaseous stream to an area of collection, collecting the fibers into the form of a porous mat, producing a thermosetting resin binder containing material that has reversible shear thinning gel properties, forcing said binder material through distribution surfaces which shear the binder containing material into a particulate state for collection by the fibers, causing said particulate state of binder to revert to a gel thickened condition and to be retained by the fibers in the form of a gel, and curing the resin of the gel in situ to bind the fibers together.

2. The method of claim 1 including the steps of: redistributing the gel along the fibers after initial deposition to move the gel to fiber crossover points before curing the resin.

3. The method of claim 2 wherein the redistribution of the gel is produced by heating the gel.

4. The method of claim 2 including the step of moving the fibers having the gel thereon out of said gaseous stream before performing the redistribution of the gel.

5. In the method of producing bonded fiber glass mats wherein molten streams of glass are attenuated by a stream of hot gases from which the fibers are collected in the form of a mat, the improvement comprising: producing a thermosetting resin binder containing material that has reversible shear thinning gel properties, forcing said binder material through spray nozzles to form subdivided globules of gel, causing said globules of gel to be caught and retained by said fibers, and curing the binder globules to bond the fibers together.

6. The method of claim 5 including the steps of: producing a plurality of molten streams of glass aligned across the width of a foraminous collection surface, attenuating the streams of glass by passing between pull rolls, passing the streams of glass discharged by the pull rolls past jets of hot gases which further softens and attenuates the streams into fibers, and causing the gel to be applied to the fibers by spraying a gel containing the binder onto the fibers as they leave the vicinity of the jets of hot attenuating gases.

7. The method of claim 5 including the steps of: producing a plurality of molten streams of glass in a row across the width of the collection area, directing jets of attenuating gases downwardly onto the streams from both sides of the row of molten streams of glass, and causing the gel containing the binder to be sprayed into the gases in the vicinity of the attenuating jets.

8. The method of claim 5 including the steps of: centrifuging molten glass through a container having openings therein to produce small molten streams of glass, directing gases at a temperature above the melting point of the glass downwardly past the molten streams of glass issuing from the centrifuging container, and causing the gel containing the binder to be sprayed into the gases discharged from around said centrifuging container.

9. The method of claim 5 including the steps of: feeding long lengths of glass filaments into chopping apparatus which subdivides the filaments into short lengths, and causing the gel containing the binder to be sprayed at the chopped fibers issuing from the chopping apparatus.

10. The method of claim 5 including the steps of: chopping packages of coiled strands of glass fibers into bundles of short length strands, passing the bundles of short length strands through picking apparatus, and causing the gel containing the binder to be sprayed onto the picked fibers discharged from said apparatus.

11. The method of claim 8 wherein the gel is an aqueous gel containing a phenolic resin binder.

References Cited

UNITED STATES PATENTS

| | | | |
|---|---|---|---|
| 3,020,585 | 2/1962 | Berthon et al. | 65—4 |
| 3,170,197 | 2/1965 | Brenner | 65—4 UX |
| 3,336,185 | 8/1967 | Helbing | 65—3 |
| 3,337,669 | 8/1967 | Shannon et al. | 65—4 |
| 3,462,254 | 8/1969 | Marzocchi et al. | 65—3 |
| 3,533,768 | 10/1970 | Wong et al. | 65—3 |

S. LEON BASHORE, Primary Examiner

R. L. LINDSAY, JR., Assistant Examiner

U.S. Cl. X.R.

65—4; 117—126 GR; 156—62.6